United States Patent [19]

Todd, Jr. et al.

[11] 3,932,592

[45] Jan. 13, 1976

[54] PROCESS FOR PREPARING CATHODOCHROMIC SODALITE

[75] Inventors: Lee T. Todd, Jr.; Eugene F. Farrell, both of Lexington; Arthur Linz, Winchester, all of Mass.

[73] Assignee: Massachusetts Institute of Technology, Cambridge, Mass.

[22] Filed: Apr. 1, 1974

[21] Appl. No.: 456,962

[52] U.S. Cl. ............... 423/328; 423/329; 423/330; 252/301.4 F
[51] Int. Cl.$^2$ .................. C01B 33/26; C01B 33/28; C09K 11/08
[58] Field of Search.................... 423/328, 329, 330; 253/301.4 F

[56] References Cited
UNITED STATES PATENTS

| | | | |
|---|---|---|---|
| 2,761,846 | 9/1956 | Medved........................ | 252/301.4 F |
| 3,705,323 | 12/1972 | Shidlovsky................ | 252/301.4 F X |
| 3,760,063 | 9/1973 | Dreyfus............................... | 423/328 |
| 3,773,540 | 11/1970 | Shidlovsky................ | 252/301.4 F X |

OTHER PUBLICATIONS
Williams et al. "J. American Ceramic Society" Vol. 52, No. 3, 1969, pp. 139–145.

Todd "Investigation of the Properties of Cathodochromic Sodalite and Cathodochromic CRT Display Devices" Feb. 1974, M.I.T., Feb. 1974, pp. 38–41.

*Primary Examiner*—Edward J. Meros
*Attorney, Agent, or Firm*—Arthur A. Smith, Jr.; Robert Shaw; Martin M. Santa

[57] ABSTRACT

A process for preparing cathodochromic materials whereby coloration properties of the materials are enhanced by a low-temperature re-crystallization process. Crystalline powders formed using either hydrothermal or sintering growth techniques are hydrothermally re-crystallized at a temperature sufficiently high and for a time sufficiently long to effect re-crystallization. The temperature range for hydrothermal re-crystallization is 60°C to 300°C and the re-crystallization growth time is at least the order of 12 hours and, more typically, the order of three days. There is shown a cathode ray tube employing said materials.

19 Claims, 9 Drawing Figures

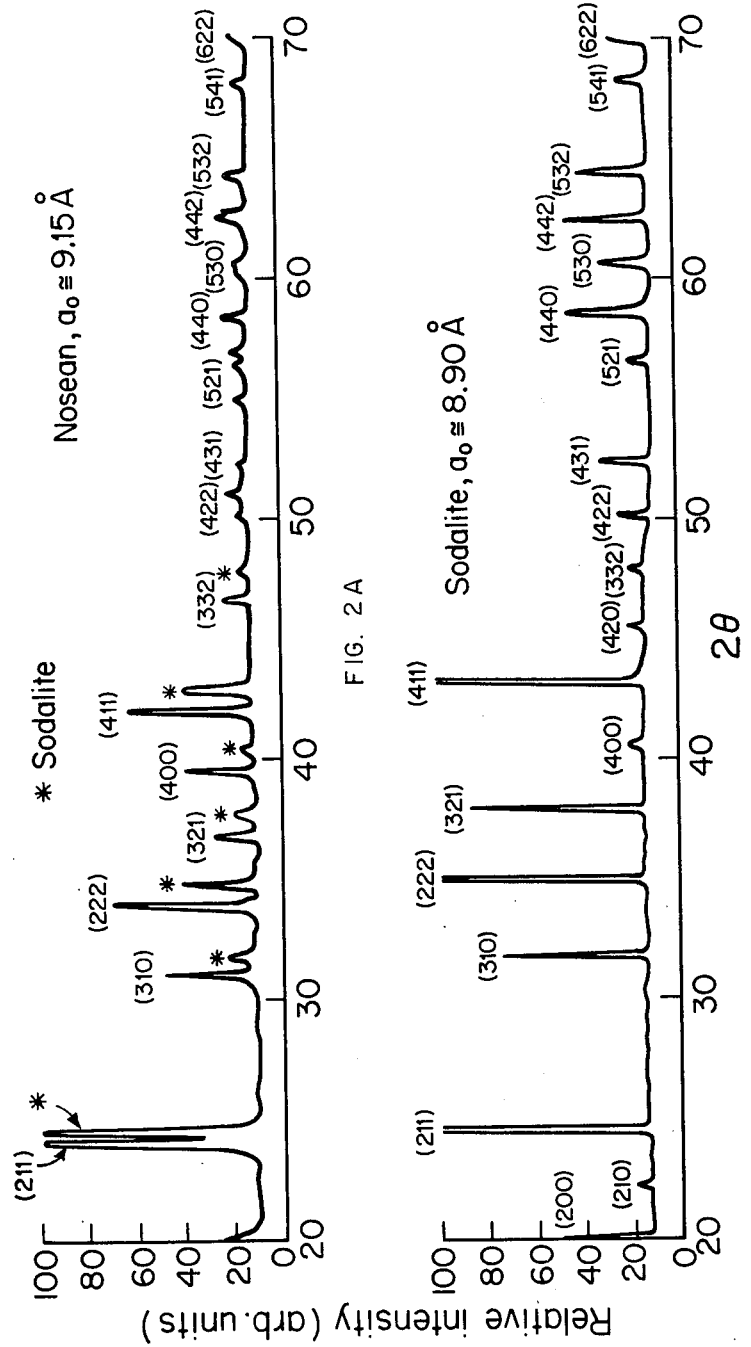

FIG. 3A
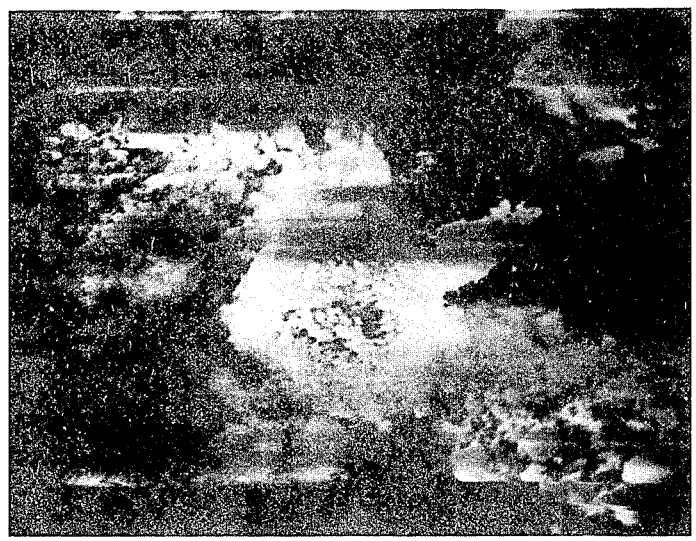
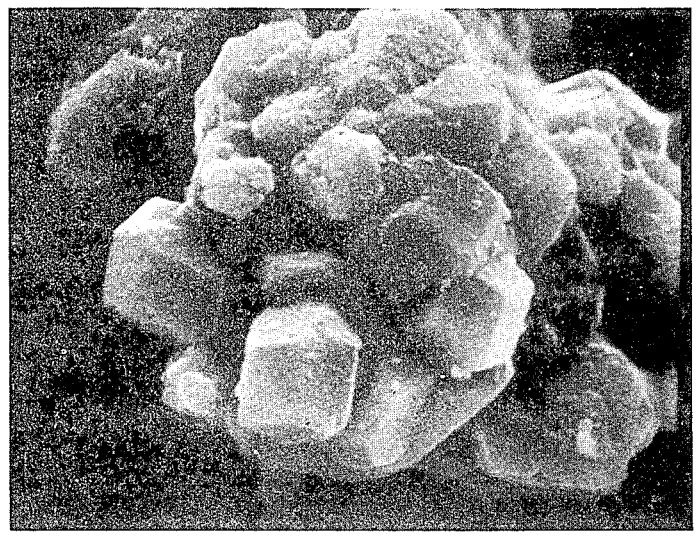
FIG. 3B

FIG. 6A
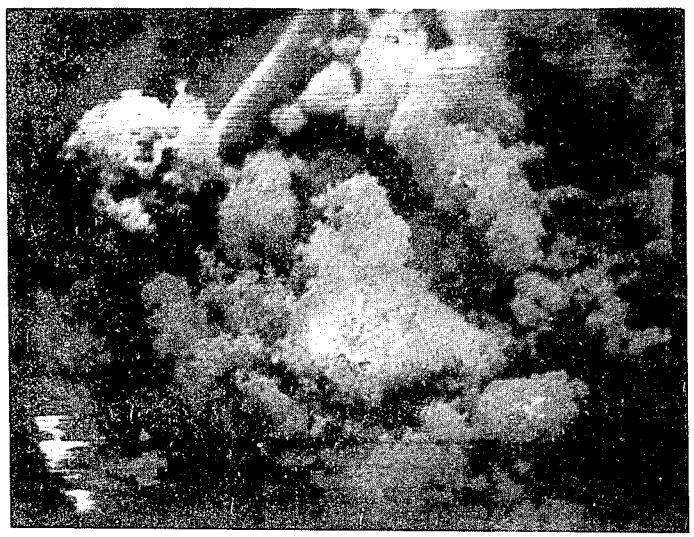
FIG. 6B

PROCESS FOR PREPARING CATHODOCHROMIC SODALITE

The invention described herein was made in the course of or under a grant from the National Science Foundation, an agency of the United States Government.

The present invention relates to methods of preparing cathodochromic sodalite and to cathode ray tube using the same.

Attention is called to the following related applications being filed herewith and hereby incorporated herein by reference: "Cathode Ray Tube Having an Image Screen Material that Is Both Cathodochromic and Fluorescent and the Material for the Screen," Ser. No. 456,961, filed April 1, 1974. (Todd et al.); "Method of and Apparatus for Exciting Luminescence in a Cathode Ray Tube Having an Image Screen Composed of a Material that Is Both Cathodochromic and Cathodoluminescent," Ser. No. 457,112, filed April 1, 1974 (Todd); and "Cathode Ray Tube Employing Faceplate-Deposited Cathodochromic Material and Electron Beam Erase," Ser. No. 456,111, filed April 1, 1974 (Todd). Attention is called also to the doctoral thesis of Lee T. Todd, Jr. at M.I.T., a copy of which accompanies herewith, which thesis is hereby incorporated herein by reference; the work upon which the thesis is based being done by the inventor Todd, Jr., under the supervision of the inventor Linz and with the collaboration and consultation, as to some aspects thereof, with the inventor Farrell. The thesis contains an exhaustive list of references to prior work as well as detailed theoretical analysis, neither of which is repeated here. The following U.S. Pat. Nos. are made of record: 3,705,323 (Shidlovsky); 3,598,750 (Phillips); 2,752,521 (Ivey); 2,761,846 (Medved); 3,706,845 (Heyman et al.); 3,148,281 (Fyler).

Cathodochromic materials have the property of changing color when excited by an electron beam beyond some threshold. The coloration can be erased by thereafter heating the material to about 200°C. These properties have led to the use of cathodochromic sodalite as a screen material for cathode ray tube (CRT) display devices. Such devices have the properties of high resolution, high contrast in bright ambient light, gray scale, and very long inherent memory.

A principal object of the present invention is to provide cathodochromic sodalite having greatly increased contrast ratio (e.g., 40:1) than has heretofore been available.

A further object is to provide a material by a process which eliminates the need for high-temperature, high-pressure, hydrothermal reaction.

These and still further objects are discussed hereinafter and are particularly delineated in the appended claims.

The objects are attained by a process for preparing cathodochromic sodalite consisting essentially of sodalite of the formula $Na_6Al_6Si_6O_{24} \cdot 2(1-z)NaX$, wherein $z$ is the fraction of NaX vacancies formed, for example, by hydrogen annealing, as later discussed, and X is taken from the group consisting of chlorine, bromine, iodine, OH and mixtures thereof, in which there is first formed a crystalline two-phase powder, basic nosean being the second phase. There are several available ways to produce the powder, but hydrothermal techniques appear to be best. Thereafter the powder is subjected to low-temperature re-crystallization whereby increased sensitivity is realized in the finished product. In the process, essentially stoichiometric quantities of sodium hydroxide, sodium halide, aluminum oxide and silicon dioxide are mixed to form a charge; water and further sodium hydroxide are added to the charge to form a mixture having an excess of sodium hydroxide; and the mixture is reacted hydrothermally at a temperature between 300°C and 500°C for at least the order of 12 hours with an internal pressure of about 2000 psi. The lower or dissolving zone of the mixture is kept at least 10°C higher in temperature than the upper or growth zone of the mixture; the resulting product of reaction is cooled to room temperature; it appears as a slurry containing crystalline powder in a concentrated sodium hydroxide solution. The sodium hydroxide solution is removed from the product to provide a crystalline powder. The powder is next hydrothermally transformed at a temperature sufficiently high and a growth period sufficiently long to effect re-crystallization, the resulting powder is then annealed in hydrogen at between 550°C and 950°C for fifteen minutes to an hour to sensitize the powder for electron-beam coloration.

The invention is hereinafter discussed with reference to the accompanying drawing in which:

FIG. 2A is a reproduction of the X-ray powder pattern of the two-phase crystalline powder, consisting of a mixture of sodalite and basic nosean, which results from the initial hydrothermal reaction herein discussed;

FIG. 2B is a reproduction, like FIG. 2A, of the X-ray powder pattern of a powder produced by the low temperature re-crystallization of the two-phase powder whose powder pattern is shown in FIG. 2A;

FIG. 3A is a scanning electron microscope picture of a two-phase crystalline powder, consisting of a mixture of sodalite and basic nosean, which results from the initial hydrothermal reaction (mag. x2000);

FIG. 3B is a scanning electron microscope picture of a powder produced by the low-temperature re-crystallization of the two-phase powder shown in FIG. 3A (mag. x4750);

FIG. 6A is a scanning electron microscope picture of a sodalite powder grown by the sintering process herein described; and FIG. 6B is a scanning electron microscope picture of a powder produced by the low-temperature re-crystallization of the powder shown in FIG. 6A.

Figure 1:
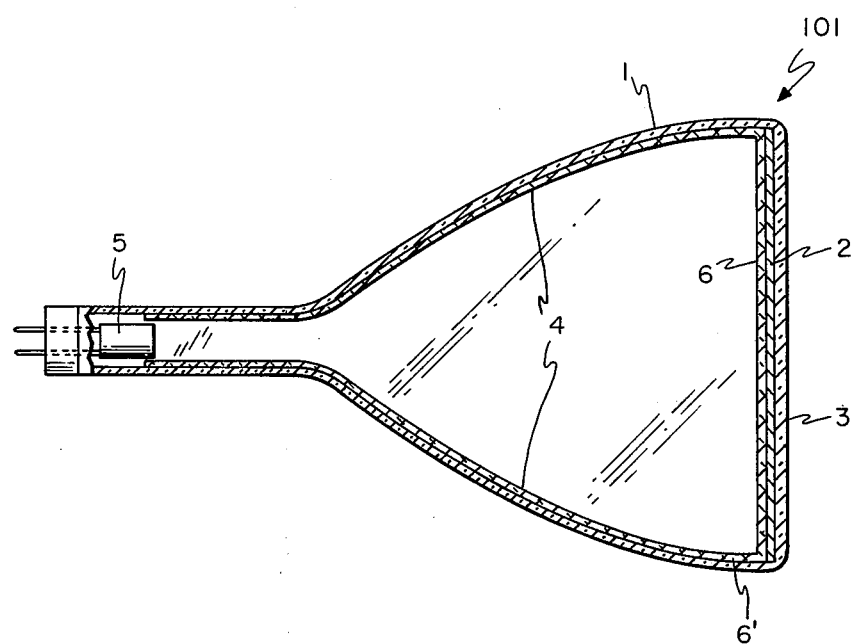
FIG. 1 is a side section view of a cathodochromic cathode ray tube with a sodalite image screen.

The name sodalite is used very broadly to refer to both a specific material, $Na_6Al_6Si_6O_{24} \cdot 2NaX$ and also to a family of materials each with the same crystal structure but different chemical compositions. Most sodalite, as grown, is not cathodochromic. Several methods are used to sensitize the material; however annealing in a reducing atmosphere, usually hydrogen, is most common (such annealing creates vacancies so that the last part of the above formula becomes $2(1-z)NaX$, wherein $0<z<1$ and represents NaX vacancies). Typical annealing treatments are conducted between 750° and 900°C for 15 minutes to an hour. Also, usually, the sodalite is produced in the form of a crystalline powder by a single growth technique, either hydrothermally or by sintering. It has been found for present purposes that coloration sensitivity can be enhanced by a two-step crystallization technique wherein sodalite powders are formed, rich in basic nosean, and the powders containing nosean are completely converted to sodalite by a low-temperature hydrothermal re-crystallization treatment to give a resulting powder that, after annealing, has a degree of crystallization and a coloration sensitivity far exceeding those obtained by either the sintering method or the hydrothermal method alone. In the description of the present process that follows, the first, nosean-containing, crystalline powders are discussed in connection with a hydrothermal growth technique, but, in the examples, sintering is included and the powders do not necessarily contain nosean.

The present process, as noted, is employed to prepare high-sensitivity, cathodochromic sodalite. The fundamental powders are formed by first mixing essentially stoichiometric quantities of sodium hydroxide, sodium halide, aluminum oxide and silicon dioxide to form a charge. The charge is placed in a hydrothermal pressure vessel (that has a silver lining to prevent corrosion) and water and further sodium hydroxide are added to provide a mixture having an excess of sodium hydroxide. The sodium hydroxide concentration is at least ten molar. Heat is applied to the vessel to effect a hydrothermal reaction of the mixture at a temperature between 300°C and 500°C for at least the order of 12 hours and preferably at 360°C for 24 hours. The lower or dissolving zone of the mixture is kept at least 10°C higher in temperature than the upper or growth zone of the mixture. The hydrothermally reacted mixture is then cooled to room temperature. At this juncture, the product of the hydrothermal reaction is a slurry containing crystalline powder in a concentrated sodium hydroxide solution. The crystalline powder is separated from the sodium hydroxide solution and is hydrothermally transformed at a temperature sufficiently high and a growth period sufficiently long to effect re-crystallization. Typically, the second hydrothermal treatment takes place at a temperature between 60°C and 300°C, more or less, and for a growth time of at least 12 hours and as much as 3 days. A re-crystallization temperature of about 130°C has been found to be very good. The powder can be re-crystallized in a concentrated sodium hydroxide solution; the sodium hydroxide increases the solubility of the sodalite and nosean and in the sintered material hereinafter discussed, sodium hydroxide dissolves all components.

The sodalite powders prepared by the process described above are not cathodochromic but must be annealed in a reducing atmosphere, usually hydrogen, before they can be colored by an electron beam. This process creates lattice vacancies which are necessary for color center formation, in this case F centers, and, thus, coloration. In the case of bromine sodalite, the vacancies are created by the loss of NaBr from the material during the anneal. Coloration sensitivity and maximum contrast ratio (contrast ratio, CR, is defined as the ratio of uncolored reflectance to colored reflectance) depend strongly on the annealing treatment. The coloration sensitivity initially increases with increasing annealing temperature, at constant annealing time, due to the formation of additional lattice vacancies. However, above a certain temperature, the sensitivity decreases with increasing annealing temperature due to the breakdown of the sodalite structure, caused by the removal of large amounts of NaBr in the case of bromine sodalite. This collapse results in the formation of a second phase, nepheline, in which F centers do not occur, thus reducing the coloration sensitivity.

The contrast ratio versus exposure measurements noted later were made with a brightness spot meter having a spectral response closely matched to the human eye and no additional interference filters were employed.

Examples are given later of processes for producing cathodochromic powders by the present teaching. There follows first, however, a brief description of a cathode ray tube employing the cathodochromic powders on the image screen.

The cathode ray tube is shown at 101 in FIG. 1 comprising a glass envelope 1 having a faceplate 3 upon the inner surface of which there is deposited a cathodochromic image screen 2 consisting essentially of sodalite of the formation $Na_6Al_6Si_6O_{24} \cdot 2(1-z)NaX$, wherein $z$ is the fraction of NaX vacancies and X is taken from the group consisting of chlorine, bromine, iodine, OH and mixtures thereof, the sodalite having been prepared by a process that comprises a high temperature reaction followed by a low-temperature hydrothermal reaction as more particularly described in the Examples. The cathode ray tube 101 includes, further, an electron gun 5, an anode 6 on the inner surface of the image screen 2 (Focusing and deflection means are not shown). The anode 6, which can be a thin aluminum coating, for example, is electrically connected back to the electron gun by the conductive layer labeled 6' which extends along the side walls designated 4 of the tube 1.

EXAMPLE 1

4.12 grams NaBr, 6.12 grams $Al_2O_3$, 7.20 grams $SiO_2$, are thoroughly mixed and placed in a silver lined hydrothermal pressure vessel with an internal capacity of approximately 130 ml. Ninety milliliters of a solution of $H_2O$ and 40.0 grams NaOH are then added to the charge within the vessel and the vessel is sealed. The lower portion of the vessel is maintained at 362°C and the upper portion at 329°C for about 27 hours and the vessel is then allowed to cool to room temperature. The product is a slurry of crystalline powder in a concentrated NaOH solution. The NaOH is removed by washing the powder repeatedly with distilled water. Next, the powder is dried for one hour in an oven at about 130°C and then crushed to a fine particle size. At this point, the X-ray powder pattern, FIG. 2A, consists of diffraction peaks representing two crystalline phases — sodalite and basic nosean.

The above powder is then re-crystallized by a low-temperature re-crystallization process. 12.34 grams of the powder are placed in a teflon-lined acid digestion vessel with an internal capacity of 200 ml. One-hundred and twenty milliliters of a solution of $H_2O$ and 48.0 grams NaOH are added to the charge in the vessel and the vessel sealed. The base of the vessel is maintained at 130°C for 90 hours and then cooled to room temperature. The product is again a slurry of crystalline powder in a concentrated NaOH solution and is processed as described above. An X-ray powder pattern of the product, FIG. 2B, shows complete conversion of the initial two-phase powder to single-phase sodalite.

FIG. 3A is a representative scanning electron microscope (SEM) picture of the original two-phase powder. Scanning of the sample reveals no large crystallized particles but only microcrystalline aggregates. In contrast, FIG. 3B is an SEM picture of the resulting powder after low-temperature re-crystallization. The degree of crystallization in the latter picture is even better than that obtained by a high-temperature, high-pressure, hydrothermal growth process in which single-phase sodalite is created.

Figure 5:
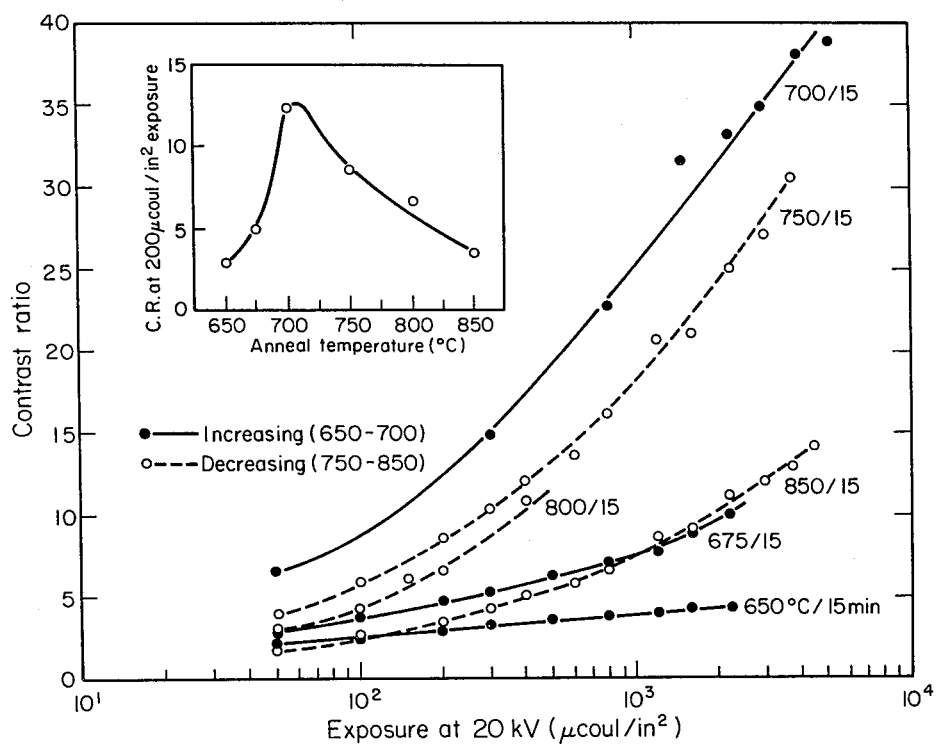
FIG. 5 is a graph of contrast ratio versus exposure characteristics as a function of hydrogen annealing temperature for a powder produced by the low temperature re-crystallization process herein described.
Figure 4:
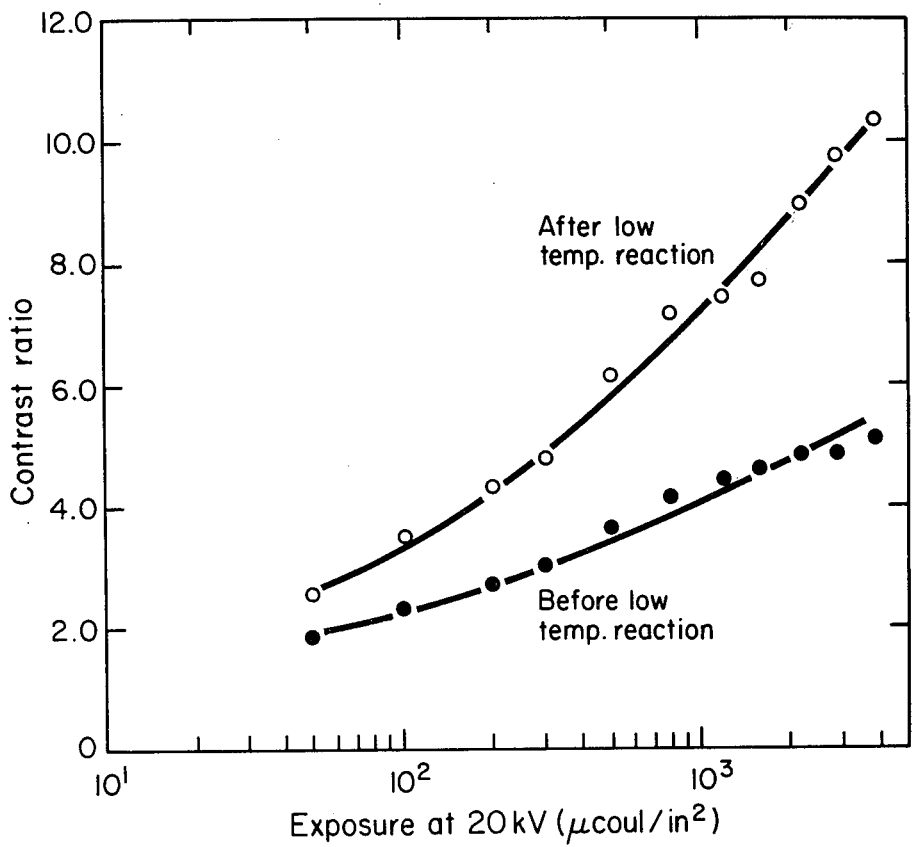
FIG. 4 is a graph of contrast ratio versus exposure characteristics for two materials, like those shown in FIGS. 3A and 3B (and having the X-ray pattern of FIGS. 2A and 2B) before and after the low temperature re-crystallization process herein described.

The important consequences of the low-temperature re-crystallization process is an increase in the material's coloration sensitivity. FIG. 4 shows a contrast ratio versus exposure characteristic for the powders whose X-ray powder pattern are shown in FIGS. 2A and 2B. The increase in sensitivity caused by the low-temperature re-crystallization results from the conversion of the lower sensitivity phases, mainly nosean and nepheline, to the highly sensitive sodalite phase. The coloration sensitivity of the material depends strongly on the hydrogen-annealing treatment. The optimum treatment for this material is annealing at 700°C for 15 minutes, as shown in FIG. 5.

EXAMPLE 2

2.75 grams NaBr, 6.12 grams $Al_2O_3$, 7.20 grams $SiO_2$, are thoroughly mixed and placed in a silver lined hydrothermal pressure vessel with an internal capacity of approximately 130 ml. An 87 ml solution of $H_2O$ and 40 grams of NaOH is then added to the charge within the vessel and the vessel sealed. The lower portion of the vessel is maintained at 360°C and the upper temperature at 340°C for a period of about 22 hours at which time the vessel is cooled to room temperature. At this point, the powder is processed as in Example 1 and an X-ray powder pattern similar to that shown in FIG. 2A is obtained.

This powder is then re-crystallized by a low-temperature re-crystallization process. 3.14 grams of the powder are placed in a teflon-lined acid digestion vessel with an internal capacity of 28 ml. An 18 ml solution of $H_2O$ and 7.20 grams NaOH are added to the charge in the vessel and the vessel sealed. The base of the vessel is maintained at 130°C for 90 hours and then cooled to room temperature. The resultant product is processed as in Example 1 and the X-ray powder pattern is similar to that shown in FIG. 2B indicating that complete conversion to sodalite has been obtained.

Finally, the powder is annealed in hydrogen in order to permit coloration by an electron beam.

EXAMPLE 3

Sodalite is also produced by a combination of sintering and low-temperature crystallization. The initial step involves thoroughly mixing 4.80 grams NaOH, 6.12 grams $Al_2O_3$, 7.20 grams $SiO_2$, 4.10 grams NaBr and sintering the resulting mixture for 2 hours at 860°C. The resulting product, in the form of a hard calcined mass, is next ball milled for several hours to reduce it to a fine-grain powder. X-ray powder patterns of the material at this stage indicate significant sodalite crystallization but also the presence of additional unwanted phases. Also, an SEM picture of the sintered material, FIG. 6A, shows no well crystallized particles but only microcrystalline aggregates.

The sintered powder is next low-temperature reacted. 3.14 grams of powder are placed in a teflon-lined acid digestion vessel with an internal capacity of 28 ml. An 18 ml solution of 7.20 grams NaOH and $H_2O$ are added to the charge in the vessel and the vessel sealed. The base of the vessel is maintained at 130°C for about 90 hours and then cooled to room temperature. The resultant product is a slurry of crystalline powder in a concentrated NaOH solution. The powder is then processed as in Example 1. The X-ray powder pattern of the material shows almost complete conversion of the initial powder to sodalite.

Finally, the powder is annealed in hydrogen in order to permit coloration by an electron beam.

Modifications of the invention herein disclosed will occur to persons skilled in the art and all such modifications are deemed to be within the spirit and scope of the invention as defined by the appended claims.

What is claimed is:

1. A process for preparing cathodochromic sodalite consisting essentially of sodalite of the formula $Na_6Al_6Si_6O_{24} \cdot 2(1-z)$ NaX, wherein $z$ is the fraction of NaX vacancies and X is taken from the group consisting of chlorine, bromine, iodine, OH and mixtures thereof, that comprises: mixing essentially stoichiometric quantities of sodium hydroxide, sodium halide, aluminum oxide and silicon dioxide to form a charge; placing the charge in a hydrothermal pressure vessel having a lower or dissolving zone and an upper or growth zone; adding to the charge water and further sodium hydroxide to provide an excess of sodium hydroxide in the charge; applying heat to the vessel and maintaining the temperature of the charge therein between 300°C and 500°C, the lower or dissolving zone of the vessel being at least 10°C higher in temperature than the upper or growth zone of the vessel, the 300°C to 500°C temperature being maintained for at least the order to 20 hours; cooling the vessel to room temperature and removing from the vessel the material which is in a crystallized powder form in a concentrated sodium hydroxide solution and contains a sodalite phase and unwanted phases; hydrothermally re-crystallizing the powder in a hydrothermal vessel at a temperature of at least 80°C for the order of 3 days to convert the unwanted phases to the sodalite phase and provide a resulting powder that is high in sodalite; and annealing the resulting powder in hydrogen between 550°C and 950°C for 15 minutes to an hour.

2. A process for preparing cathodochromic sodalite consisting essentially of sodalite of the formula $Na_6Al_6Si_6O_{24} \cdot 2(1-z)$ NaX, wherein $z$ is the fraction of NaX vacancies and X is taken from the group consisting of chlorine, bromine, iodine, OH and mixtures thereof, that comprises: mixing essentially stoichiometric quantities of sodium hydroxide, sodium halide, aluminum oxide and silicon dioxide to form a charge; adding water and further sodium hydroxide to the charge to form a mixture having an excess of sodium hydroxide; reacting the mixture hydrothermally at a temperature between 300°C and 500°C for at least the order of twelve hours, the lower or dissolving zone of the mixture being at least 10°C higher in temperature than the upper or growth zone of the mixture; cooling to room temperature the product of the reaction which appears as a slurry containing crystalline powder in a concentrated sodium hydroxide solution; removing the sodium hydroxide solution from the product to provide a crystalline powder containing sodalite crystals and other component crystals; hydrothermally transforming the crystalline powder at a temperature sufficiently high and a growth period sufficiently long to effect re-crystallization of at least some of said other component crystals to sodalite crystals; and annealing the resulting powder in hydrogen between 550°C and 950°C for at least 15 minutes.

3. A process as claimed in claim 2 in which the powder is re-crystallized in concentrated sodium hydroxide solution.

4. A process as claimed in claim 2 in which the sodium hydroxide concentration in the first-named hydrothermal treatment is at least 10 molar.

5. A process as claimed in claim 2 in which the temperature to effect hydrothermal re-crystallization is in the range of 60°C to 300°C, more or less.

6. A process as claimed in claim 5 in which the hydrothermal re-crystallization growth time is at least the order of twelve hours.

7. A process as claimed in claim 6 in which the hydrothermal re-crystallization growth time is about 3 days.

8. A process as claimed in claim 5 in which the temperature to effect hydrothermal re-crystallization is about 130°C.

9. A process for preparing cathodochromic sodalite consisting essentially of sodalite of the formula $Na_6Al_6Si_6O_{24} \cdot 2(1-z)NaX$, wherein $z$ is the fraction of NaX vacancies and X taken from the group consisting of chlorine, bromine, iodine, OH and mixtures thereof, that comprises: mixing quantities of sodium hydroxide, sodium halide, aluminum oxide and silicon dioxide to form a charge; comminuting the charge; sintering the comminuted charge to form a crystalline material containing a sodalite phase and at least one unwanted phase; comminuting the sintered product to form a powder; hydrothermally transforming the powder at a temperature sufficiently high and a growth period sufficiently long to effect re-crystallization of at least some of said at least one unwanted phase to increase the sodalite phase in the powder; and annealing the resulting powder in hydrogen between 550°C and 950°C for at least 15 minutes to an hour.

10. A process as claimed in claim 9 in which the quantities of sodium hydroxide, sodium halide, aluminum oxide and silicon dioxide are essentially stoichiometric.

11. A process as claimed in claim 9 in which the powder is re-crystallized in a concentrated sodium hydroxide solution.

12. A process as claimed in claim 9 in which the sintering temperature is about 750°C and the sintering time is at least 8 hours and which includes the further step of raising the temperature to about 1000°C for at least 1 hour.

13. A process as claimed in claim 9 in which the temperature to effect hydrothermal re-crystallization is in the range of 60°C to 300°C, more or less.

14. A process as claimed in claim 13 in which the hydrothermal re-crystallization growth time is at least the order of 12 hours.

15. A process as claimed in claim 13 in which the hydrothermal re-crystallization growth time is about 3 days.

16. A process as claimed in claim 13 in which the temperature to effect hydrothermal re-crystallization is about 130°C.

17. A process for preparing cathodochromic sodalite, that comprises, forming a crystalline powder having a plurality of phases and containing substantial amounts of a sodalite phase consisting essentially of sodalite of the formula, $Na_6Al_6Si_6O_{24} \cdot 2NaX$, wherein X is taken from the group consisting of chlorine, bromine, iodine, OH and mixtures thereof, and at least one unwanted phase, hydrothermally transforming the crystalline powder at a temperature sufficiently high and a growth period sufficiently long to effect re-crystallization thereof, whereby at least some of said at least one unwanted phase is re-crystallized to the sodalite phase, and sensitizing the re-crystallized material to render it cathodochromic.

18. A process as claimed in claim 17 in which said temperature is in the range from about 60°C to 300°C, and in which said period is at least 12 hours.

19. A process as claimed in claim 18 in which the re-crystallized material is annealed in hydrogen between 550°C and 750°C for at least 15 minutes to sensitize the same.

* * * * *